US009342819B1

(12) United States Patent
Appelman et al.

(10) Patent No.: US 9,342,819 B1
(45) Date of Patent: *May 17, 2016

(54) TARGETED NOTIFICATION OF USERS OF A COMMUNICATIONS SYSTEM BASED ON A LOCATION, DEVICE TYPE, AND/OR SOFTWARE TYPE OF THE USERS

(75) Inventors: Barry Appelman, Arlington, VA (US); Larry L. Lu, Great Falls, VA (US); Jian Wang, Sterling, VA (US)

(73) Assignee: AOL Inc., Dulles, VA (US)

(*) Notice: Subject to any disclaimer, the term of this patent is extended or adjusted under 35 U.S.C. 154(b) by 781 days.

This patent is subject to a terminal disclaimer.

(21) Appl. No.: 13/343,635

(22) Filed: Jan. 4, 2012

Related U.S. Application Data

(63) Continuation of application No. 09/842,024, filed on Apr. 26, 2001.

(60) Provisional application No. 60/236,351, filed on Sep. 29, 2000.

(51) Int. Cl.
*G06F 13/00* (2006.01)
*G06Q 10/10* (2012.01)

(52) U.S. Cl.
CPC .................................. *G06Q 10/107* (2013.01)

(58) Field of Classification Search
USPC ......................................................... 709/206
See application file for complete search history.

(56) References Cited

U.S. PATENT DOCUMENTS

| | | | |
|---|---|---|---|
| 5,742,905 A | 4/1998 | Pepe et al. | |
| 5,878,219 A | 3/1999 | Vance et al. | |
| 5,951,643 A | 9/1999 | Shelton et al. | |
| 5,951,652 A | 9/1999 | Ingrassia et al. | |
| 5,954,798 A | 9/1999 | Shelton et al. | |
| 5,961,603 A | 10/1999 | Kunkel et al. | |
| 5,973,683 A | 10/1999 | Cragun et al. | |
| 5,991,735 A | 11/1999 | Gerace | |
| 6,029,195 A | 2/2000 | Herz | |
| 6,047,327 A | 4/2000 | Tso et al. | |
| 6,061,056 A | 5/2000 | Menard et al. | |

(Continued)

FOREIGN PATENT DOCUMENTS

| | | |
|---|---|---|
| EP | 674 286 | 9/1995 |
| EP | 854 645 | 7/1998 |

(Continued)

OTHER PUBLICATIONS

"AOL Instant Messenger Windows Beta Features." Jun. 24, 1999, 2 pages, AOL Instant Messenger All New Version 2.0, 2 pages, Jun. 24, 1999; What is AOL Instant Messenger, 3 pages, Jun. 24, 1999; Quick Tips for Getting Started, 5 pages, Jun. 24, 1999; Frequently Asked Questions About AOL Instant Messenger, 6 pages, Jun. 24, 1999.

(Continued)

*Primary Examiner* — Robert B Harrell

(74) *Attorney, Agent, or Firm* — Finnegan, Henderson, Farabow, Garrett & Dunner LLP

(57) ABSTRACT

A method for transmitting data to one or more users of a communications system by establishing a connection with one or more users; designating targeting rules applicable to online users; acquiring context information of online users; applying the targeting rules to the context information to identify targeted online users; and sending data to the targeted online users.

20 Claims, 11 Drawing Sheets

(56) References Cited

U.S. PATENT DOCUMENTS

| | | |
|---|---|---|
| 6,070,145 A | 5/2000 | Pinsley et al. |
| 6,081,793 A | 6/2000 | Challener et al. |
| 6,128,663 A | 10/2000 | Thomas |
| 6,151,631 A | 11/2000 | Ansell et al. |
| 6,175,833 B1 | 1/2001 | West et al. |
| 6,182,050 B1 | 1/2001 | Ballard |
| 6,189,029 B1 | 2/2001 | Fuerst |
| 6,236,975 B1 | 5/2001 | Boe et al. |
| 6,317,833 B1 | 11/2001 | Jakobsson |
| 6,360,172 B1 | 3/2002 | Burfeind et al. |
| 6,477,504 B1 | 11/2002 | Hamlin et al. |
| 6,629,136 B1 | 9/2003 | Naidoo |
| 6,678,500 B2 | 1/2004 | Helmick et al. |
| 6,697,824 B1 | 2/2004 | Bowman-Amuah |
| 6,728,755 B1 | 4/2004 | De Ment |
| 6,895,387 B1 | 5/2005 | Roberts et al. |
| 6,993,495 B2 | 1/2006 | Smith et al. |
| 6,996,367 B2 | 2/2006 | Pfenninger et al. |
| 7,703,611 B1 | 4/2010 | Appelman et al. |
| 2002/0002482 A1 | 1/2002 | Thomas |
| 2002/0007303 A1 | 1/2002 | Brookler et al. |
| 2002/0016731 A1 | 2/2002 | Kupersmit |
| 2003/0208395 A1 | 11/2003 | McClure et al. |
| 2004/0133463 A1 | 7/2004 | Benderev |

FOREIGN PATENT DOCUMENTS

| | | |
|---|---|---|
| WO | WO9831114 | 7/1998 |
| WO | WO9841020 | 9/1998 |
| WO | WO9904561 | 1/1999 |
| WO | WO9935600 | 7/1999 |
| WO | WO9945489 | 9/1999 |
| WO | WO9959096 | 11/1999 |

OTHER PUBLICATIONS

"AOL Technology: Turning Complicated Things into Engaging Services," 1996 Annual Report, 22 pages.

Alan Cohen, "Instant Messaging." Apr. 13, 1999; PC Labs, 2 pages.

U.S. Appl. No. 09/842,231, filed Apr. 26, 2001.

Office Action issued in U.S. Appl. No. 09/842,024 dated Apr. 26, 2001, 10 pages.

Office Action issued in U.S. Appl. No. 09/842,024 dated Jun. 13, 2005, 13 pages.

Office Action issued in U.S. Appl. No. 09/842,024 dated Sep. 9, 2004.

TARGETED NOTIFICATION OF USERS OF A COMMUNICATIONS SYSTEM BASED ON A LOCATION, DEVICE TYPE, AND/OR SOFTWARE TYPE OF THE USERS

This application is a continuation of U.S. application Ser. No. 12/720,044, filed Mar. 9, 2010 (now U.S. Pat. No. 8,095, 609), which is a continuation of U.S. application Ser. No. 09/842,024, filed Apr. 26, 2001 (now U.S. Pat. No. 7,703, 611), which claims the benefit of U.S. Provisional Application No. 60/236,351, filed Sep. 29, 2000, all of which are expressly incorporated herein by reference to their entireties.

TECHNICAL FIELD

The present invention relates generally to transferring electronic data in a communications system and more particularly to real time polling of users in a communications system.

BACKGROUND

Online service providers constantly are offering new services and upgrading existing services to enhance their subscribers' online experience. Subscribers have on-demand access to news, weather, financial, sports, and entertainment services as well as the ability to transmit electronic messages and to participate in online discussion groups. For example, subscribers of online service providers such as America Online or CompuServe may view and retrieve information on a wide variety of topics from servers located throughout the world. A server may be maintained by the service provider or by a third party provider who makes information and services available through the worldwide network of computers that make up the online service.

To forecast the outcome of future events, such as, for example, a political race, pollsters randomly survey the voting population. Similarly, providers routinely solicit customer feedback to assure that customers are satisfied with a particular product or service.

Presently, some web pages allow a viewer to vote on a particular topic and to see a running tally of the results. In general, the results obtained from such an online survey have little value because there are no measures in place to ensure accuracy.

SUMMARY

In one general aspect, data is transmitted to one or more users of a communications system by establishing a connection with one or more users; designating targeting rules applicable to online users; acquiring context information of online users; applying the targeting rules to the context information to identify targeted online users; and sending data to the targeted online users.

Implementations may include one or more of the following features. For example, the targeting rules may include parameters specifying a location of the online users. The location of the online users may be a geographic location and/or an online location. The targeting rules also may include specified parameters. The parameters may specify a particular type of access device and/or a particular type of software employed by the online users.

The context information of online users may include a token identifying a current location of an online user.

Online users may be ranked based on the specified parameters, and applying the targeting rules to the context information may include identifying online users meeting the specified parameters.

The data sent to targeted users may be specific to a location of the targeted users. The location may be a geographic location and/or an online location.

These and other general aspects may be implemented by an apparatus and/or a computer program stored on a computer readable medium that may be a disk, a client device, a host device, and/or a propagated signal.

DETAILED DESCRIPTION

For illustrative purposes, FIGS. 1-6 describe a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
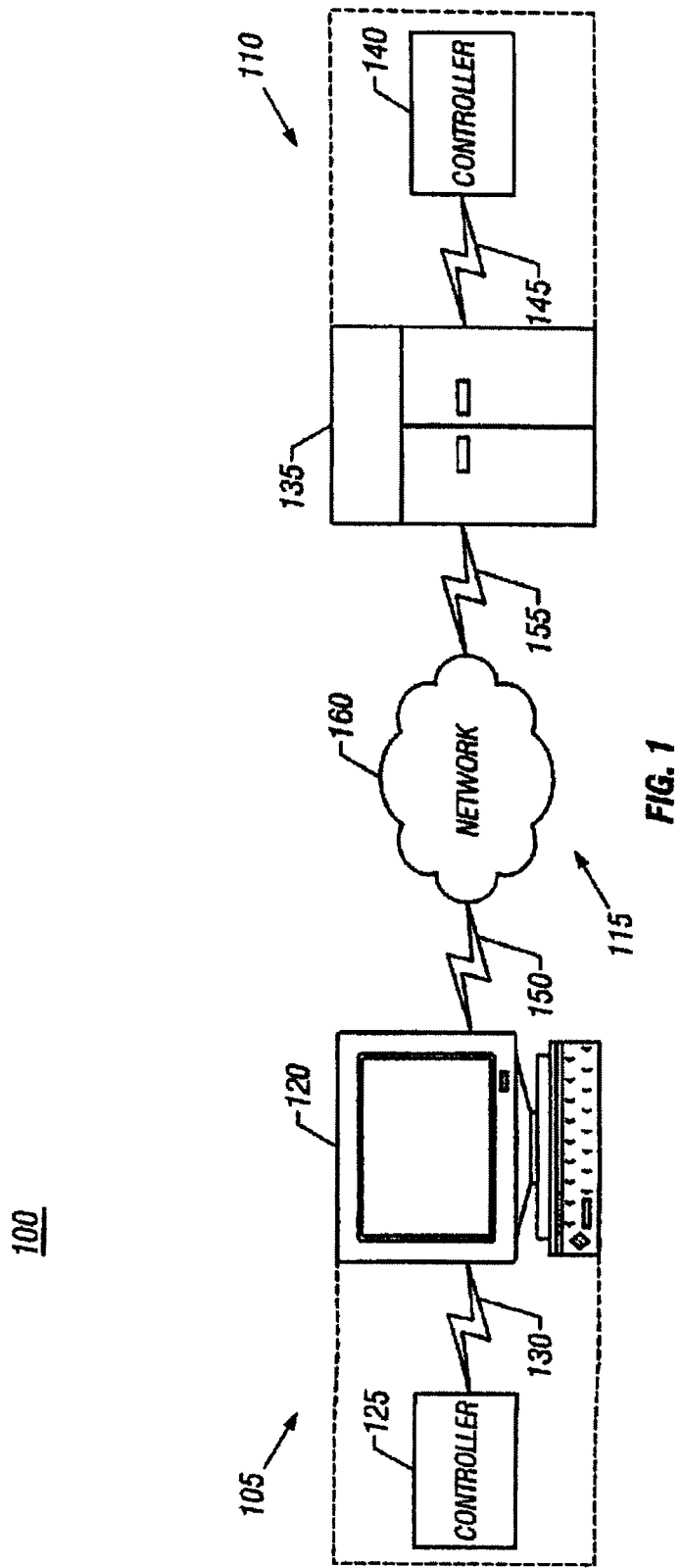
FIG. 1 is a block diagram of a communications system capable of delivering and exchanging data between a client system and a host system through a communication link.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as for example, one or more LANs ("Local Area Networks") and/or one or more WANs ("Wide Area Networks").

The client device 120 is generally capable of executing instructions under the command of a client controller 125.

The client device 120 is connected to the client controller 125 by a wired or wireless data pathway 130 capable of delivering data. The client device 120 and client controller 125 each typically includes one or more hardware components and/or software components. An example of a client device 120 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of client controller 125 is a software application loaded on the client device 120 for commanding and directing communications enabled by the client device 120. Other examples include a program, a piece of code, an instruction, a device, a computer, a computer system, or a combination thereof, for independently or collectively instructing the client device 120 to interact and operate as described herein. The client controller 125 may be embodied permanently or temporarily in any type of machine, component, equipment, storage medium, or propagated signal capable of providing instructions to the client device 120.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. Publice Switched Telephone Network (PSTN), Integrated Services Digital Network (ISDN), or x Digital Subscriber Line (xDSL)), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination thereof, for independently or collectively instructing the host device 135 to interact and operate as described herein. The host controller 140 may be embodied permanently or temporarily in any type of machine, component, equipment, storage medium, or propagated signal capable of providing instructions to the host device 135.

Figure 2:
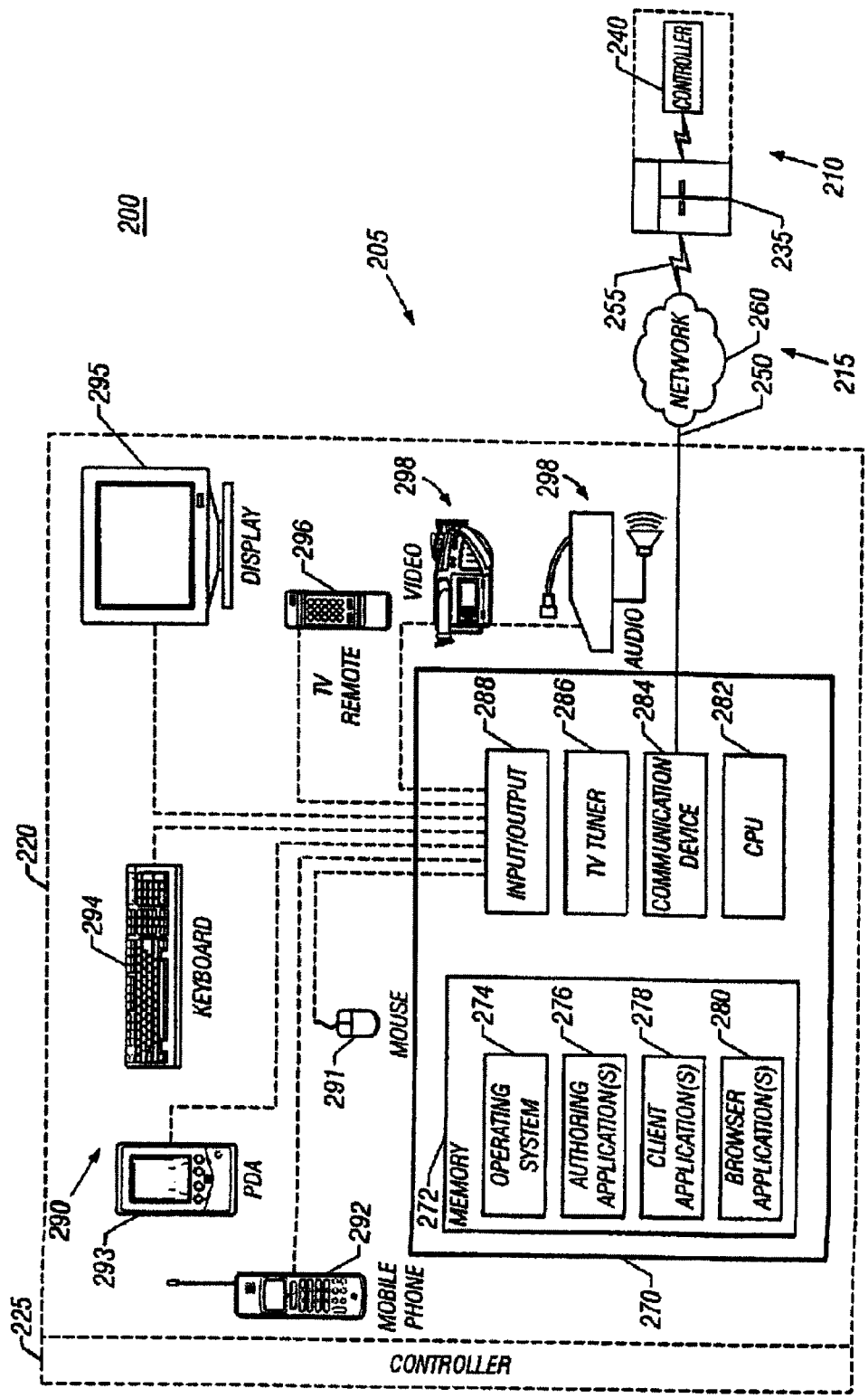
FIG. 2 illustrates components of the client system shown in the communications system of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible embodiment of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the FDA 293 may include computing and networking capabilities and function as a client device 220 by accessing the delivery network 260 and communicating with the host system 210. Furthermore, the client system 205 may include one, some or all of the components and devices described above.

Figure 3:
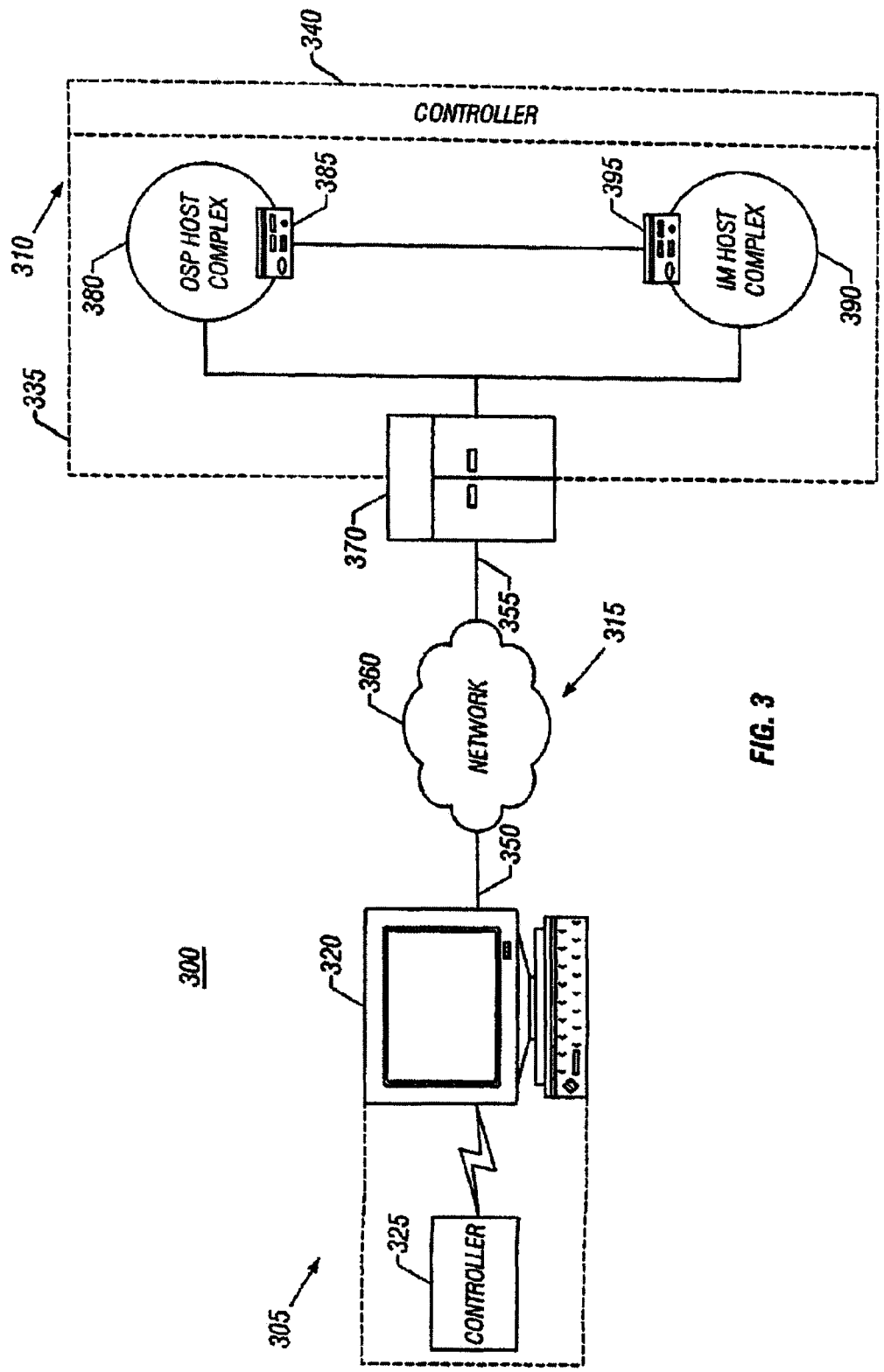
FIG. 3 illustrates components of the host system shown in the communications system of FIG. 1.

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible embodiment of the host systems 110 and 210 shown in FIGS. 1 and 2, respectively.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provide") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
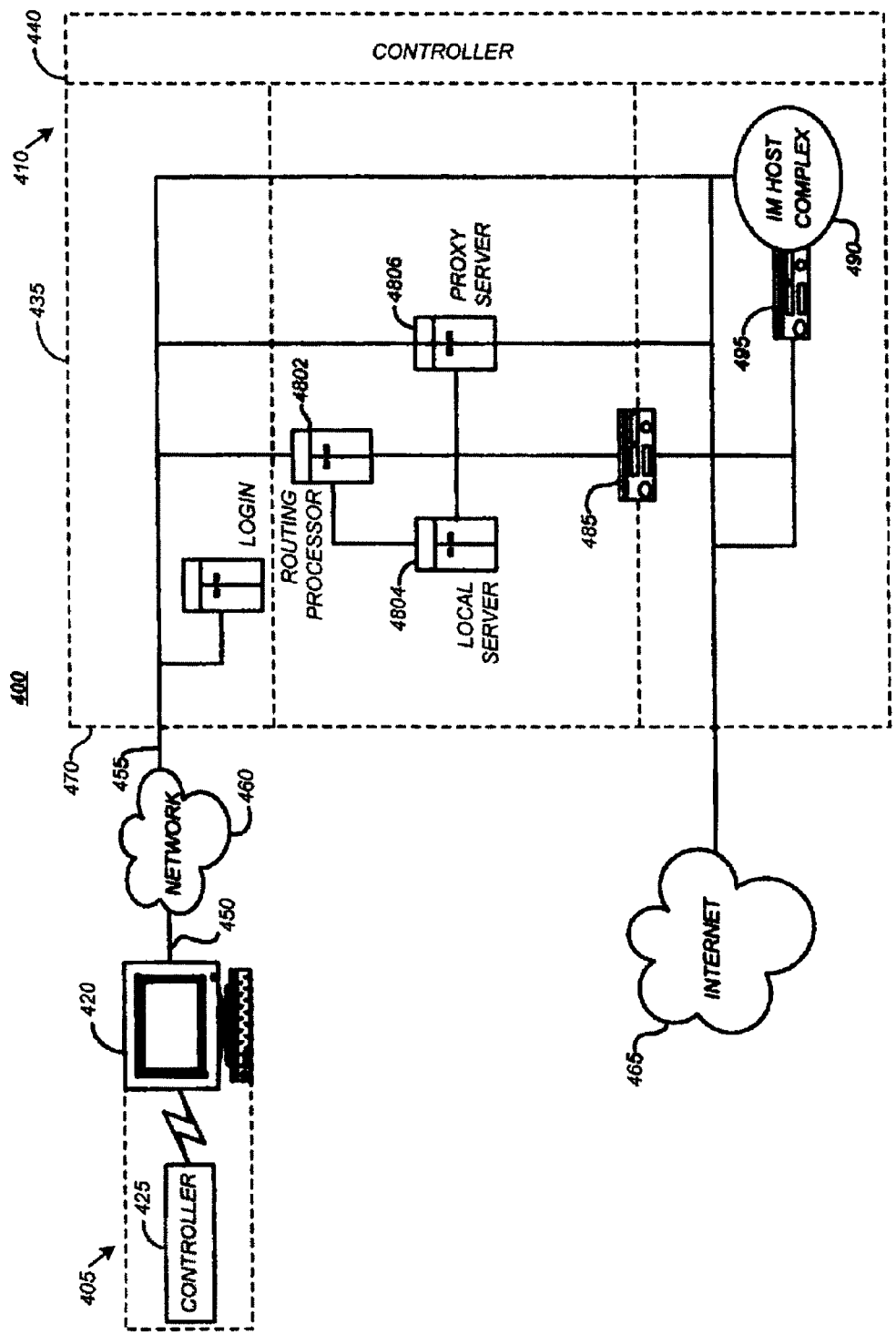
FIG. 4 illustrates an Online Service Provider complex component of the host system shown in the communications system of FIG. 1.

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible embodiment of the host systems 110, 210, and 310 shown in FIGS. 1-3, respectively. However, FIG. 4 describes an aspect of the host system 410, focusing primarily on one particular implementation of OSP host complex 480. For purposes of communicating with an OSP host complex 480, the delivery network 460 is generally a telephone network.

The client system 405 includes a client device 420 and a client controller 425. The client controller 425 is generally capable of establishing a connection to the host system 410, including the OSP host complex 480, the LM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. However, in other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communication between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In the implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465. The proxy server 4806 may include an IP ("Internet Protocol") tunnel for converting data from OSP protocol into standard Internet protocol and transmitting the data to the Internet 465. The IP tunnel also converts data received from the Internet in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include a L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
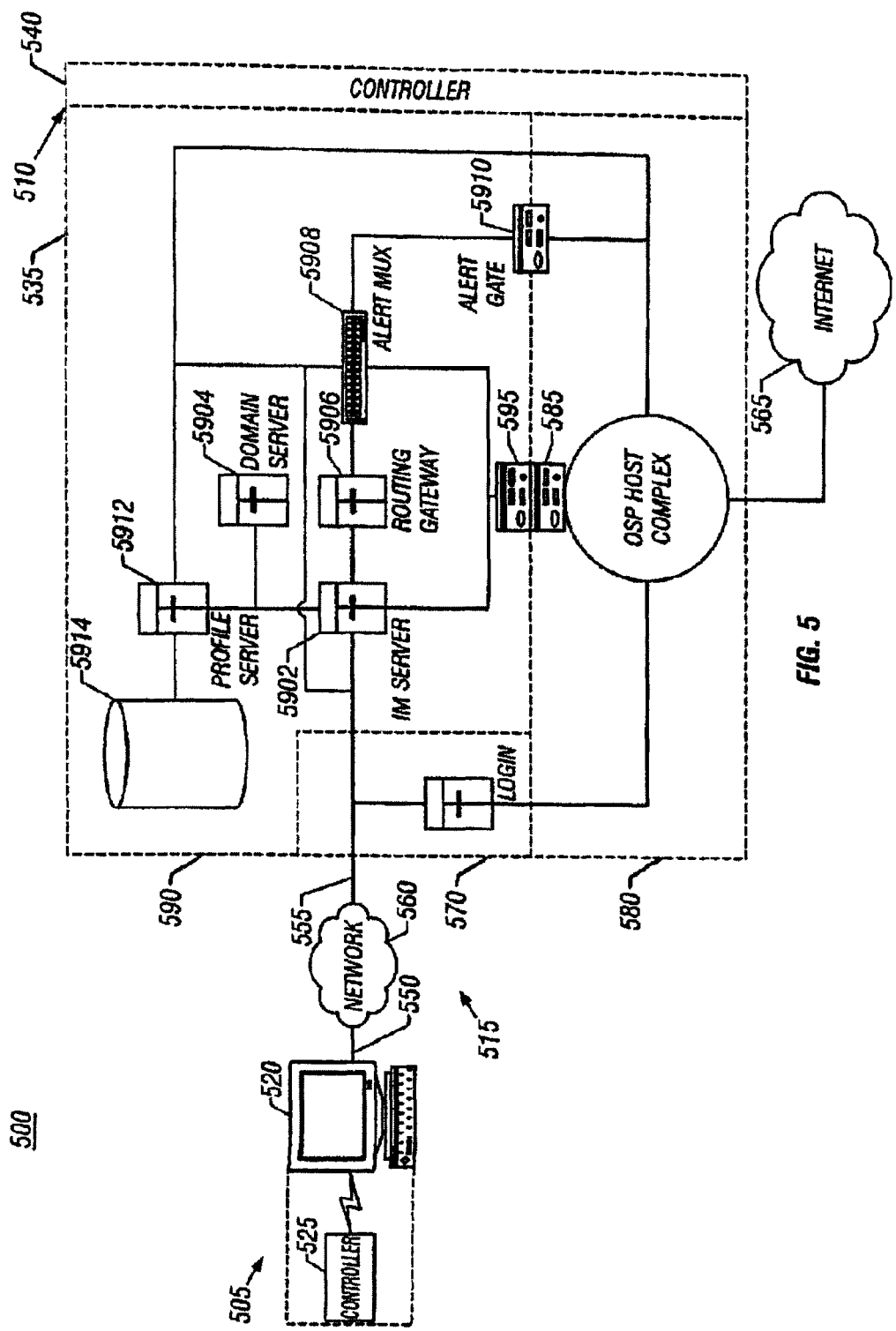
FIG. 5 illustrates an Instant Messaging complex component of the host system shown in the communications system of FIG. 1.

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible embodiment of the host systems 110, 210, 310, and 410 shown in FIGS. 1-4, respectively. However, FIG. 5 describes an aspect of the host system 510, focusing primarily on one particular implementation of IM host complex 590. For purposes of communicating with the IM host complex 590, the delivery network 560 is generally a telephone network.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers to several alert multiplexors. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
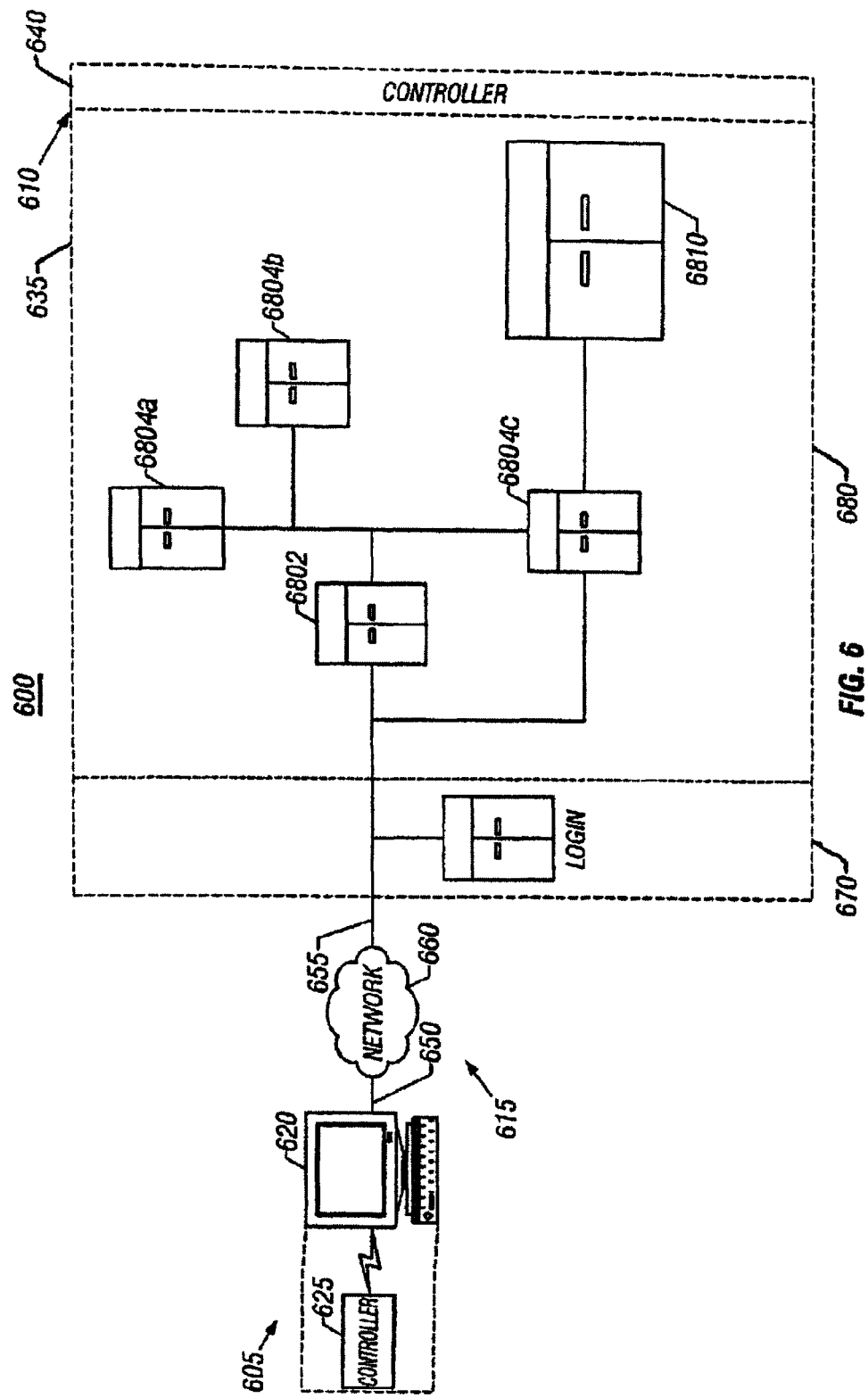
FIG. 6 illustrates one particular implementation of the host system shown in FIG. 1.

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communication link may include communication pathways 650, 655 enabling communications through the one or more delivery networks 660. The network 660 may be any known or described delivery network including, but not limited, to a telephone network and/or the Internet.

Examples of each element within the communication system of FIG. 6 are broadly described above with respect to FIGS. 1-5. In particular, the client system 605 and the communications link 615 typically have attributes comparable to those described with respect to client systems 105, 205, 305, 405, and 505 and communications links 115, 215, 315, 415, and 515 of FIGS. 1-5. Likewise, the host system 610 of FIG. 6 may have attributes comparable to and may illustrate one possible implementation of the host systems 110, 210, 310, 410, and 510 shown in FIGS. 1-5, and may illustrate one possible implementation. Of these systems, FIG. 6 describes an aspect of the host system 610, focusing primarily on one particular implementation of the host device 635.

The client system 605 includes a client device 620 and a client controller 625. The client controller 625 is generally capable of establishing a connection to the host system 610 through the delivery network 615. In one implementation, the client controller 625 includes one or more applications, such as an IM application, an OSP application, and/or an Internet browser application.

The host system 610 includes a host device 635 and a host controller 640. The host controller 640 is generally capable of transmitting instructions to any or all of the elements of the host device 635. For example, in one implementation, the host controller 640 includes one or more software applications loaded on one or more elements of the host device 635. However, in other implementations, as described above, the host controller 640 may include any of several other programs, machines, and devices operating independently or collectively to control the host device 635. The host system 610 also includes a login server 670 capable of enabling communications with and authorizing access by client systems 605 to various elements of the host system 610 including the OSP host complex 680.

As shown in FIG. 6, the OSP host complex 680 of the host device 635 includes a control server 6802 in communication with pods 6804a, 6804b, 6804c, and 6810. The control server 6802 is configured to transmit and receive data from the pods 6804a, 6804b, 6804c, and 6810 in response to certain conditions and/or commands.

Each of pod 6804a, 6804b, 6804c, and 6810 includes one or more interrelated servers capable of operating together to provide one or more services offered by the OSP host complex 680 in a geographically localized manner. In this implementation, pod 6804a includes a routing processor configured to directly or indirectly route data packets to a specified destination within or outside of the OSP host complex 680. Similarly, pod 6804b, 6804c, and 6810 includes a routing processor configured to directly or indirectly route data packets to a specified destination within or outside of the OSP host complex 680.

The pods 6804a and 6804b include local servers. The local servers, alone or collectively, are configured to provide services in a geographically localized manner to users associated with the particular pod. The OSP host complex 680 also includes non-podded servers. In the event that the data requests from a routing processor cannot be satisfied locally by the pod, the routing processor directs the data request to these non-podded servers.

In one implementation, the local servers in pod 6804a are configured to function equivalently to the local servers in pod 6804b. In such an implementation, the non-podded server 6802 communicates with the pod 6804a and the pod 6804b in basically the same manner. In another implementation, however, the local servers in pod 6804a are configured to function differently than local servers in pod 6804b. In such an implementation, the non-podded server 6802 interacts with the pod 6804a and the pod 6804b in different ways. In an implementation where the non-podded server 6802 is functioning differently with respect to pods 6804a and 6804b, certain computing elements of the non-podded server 6802 are configured to be multi-functional. Alternatively, different computing elements of the non-podded server 6802 may be configured to perform distinct functions. A more complete understanding will be garnered from the communications methods described below.

Figure 7:
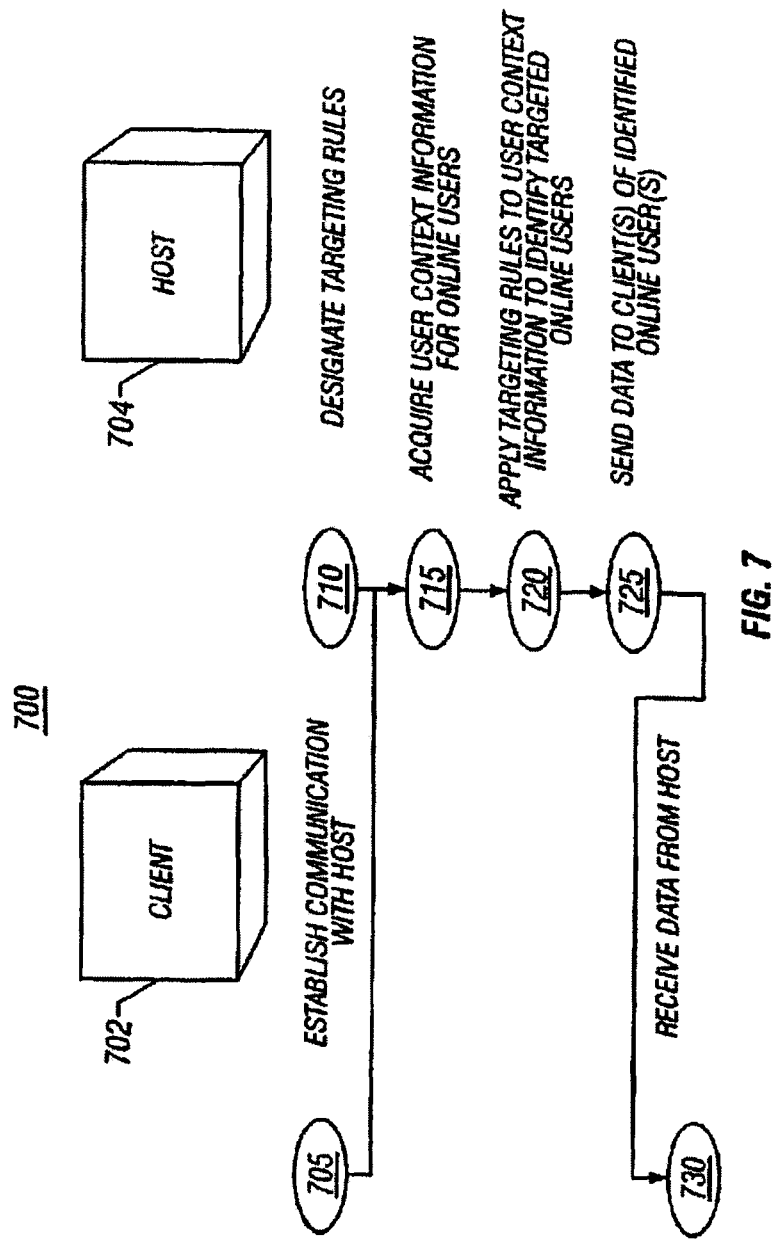
FIG. 7 illustrates a flow chart of a communications method that may be implemented by the communications system of FIG. 1.

Referring to FIG. 7, a sender 702a, a recipient 702b, and a host 704 interact according to a procedure 700 to transmit electronic data. The procedure 700 may be implemented by any type of hardware, software, device, computer, computer system, equipment, component, program, application, code, storage medium, or propagated signal.

Examples of each element of FIG. 7 are broadly described above with respect to FIGS. 1-6. In particular, client 702 typically has attributes comparable to those described with respect to client devices 120, 220, 320, 420, 520, and 620 and/or client controllers 125, 225, 325, 425, 525, and 625. The host 704 typically has attributes comparable to those described above with respect to host devices 135, 235, 335, 435, 535, and 635 and/or host controllers 140, 240, 340, 440, 540, and 640. The client 702 and the host 704 may be directly or indirectly interconnected through a known or described delivery network.

Initially, the client 702 establishes communication with the host 704 (step 705). In one implementation, the client 702 is a client system 605 associated with an end user of the communications system 600 and the host 704 is an OSP host complex 680. Typically, the client system 605 provides authorizing information to a login server 670 in order to obtain access to the OSP host complex 680. Once communication is established with the OSP host complex 680, the client system 605 may navigate to various areas within the OSP host complex 680 to take advantage of the offered services.

The host 704 designates targeting rules applicable to online users of the communications system (step 710). In one implementation, targeting rules include parameters specifying locations of online users. The location of an online user may be a geographic location and/or an online location. The targeting rules also may include specified parameters. The parameters may specify a particular type of access device and/or software employed by online users. The host 704 may designate targeting rules before, during, or after communication with the client 702.

The host 704 acquires user context information for online users (step 715). User context information may include, but is not limited to, a user's name, screen name, geographic location, software version, billing information, network information, account number, access device, and/or a recent history of accessed online locations.

The host 704 may acquire the user context information in response to a request or an event. In addition, the host 704 may continuously maintain context information for online users.

The host 704 applies the targeting rules to the user context information and identifies targeted online users (step 720). In one implementation, the targeting rules include specified parameters, and applying the targeting rules to the context information includes identifying online users meeting the specified parameters.

Once the host 704 has identified targeted online users, the host 704 sends data to the client 702 of one or more targeted online users (step 725). In general, the transmitted data is specific to a location of the targeted users. The location of the targeted users may be, for example, a geographic location and/or an online location.

The client 702 receives the data transmitted from the host 704 (step 730). Upon receipt of the data, the client 702 displays a message to the end user. The message may include, for example, timely information pertaining to the particular geographic and/or online location of the end user.

Figure 8:
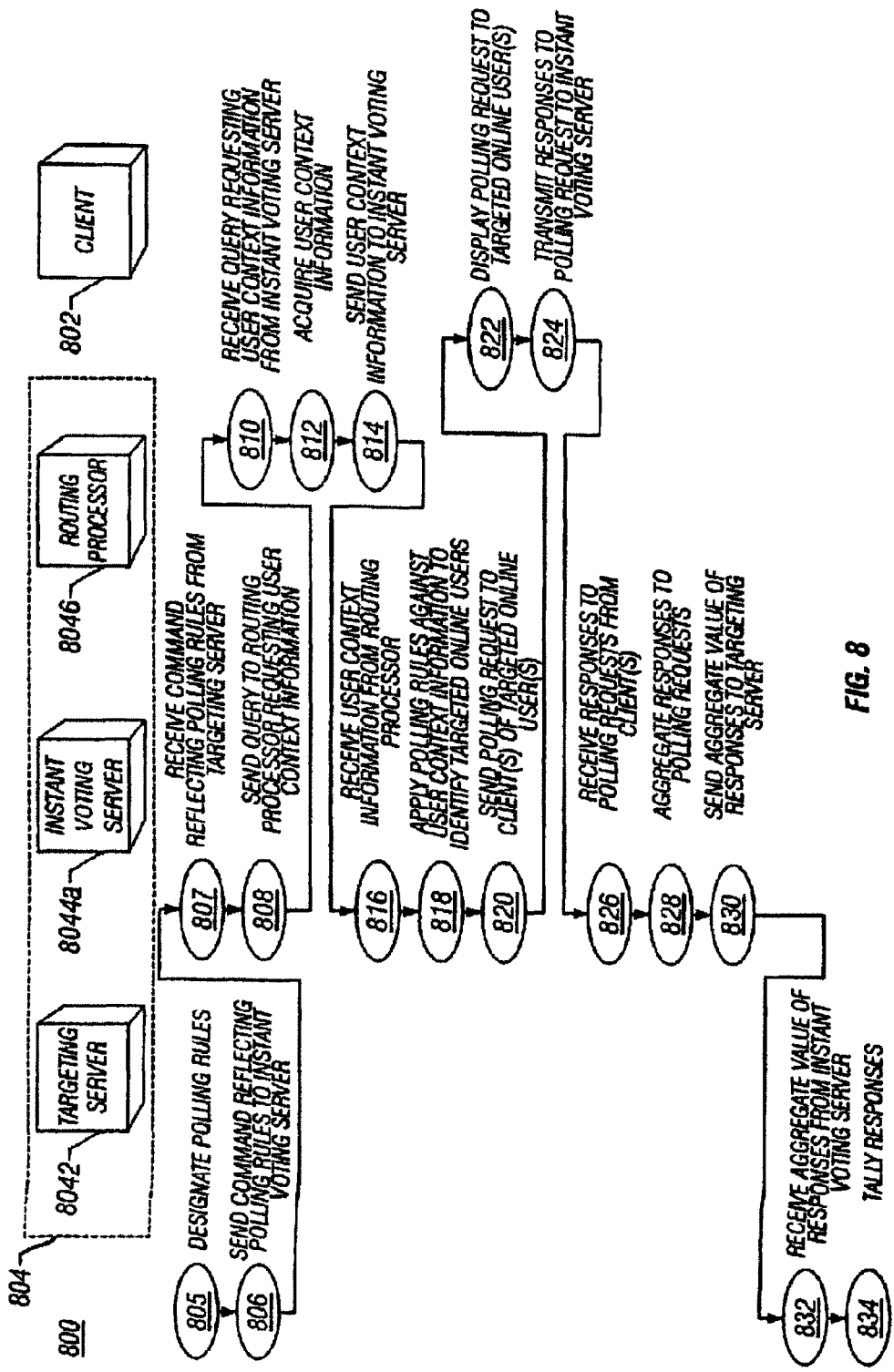
FIG. 8 illustrates a flow chart of a communications method that may be implemented by the communications system of FIG. 1 to obtain polling information from a subset of online users.

Referring to FIG. 8, a client 802 and a host 804 interact according to a procedure 800 to transmit electronic data. The procedure 800 may be implemented by any type of hardware, software, device, computer, computer system, equipment, component, program, application, code, storage medium, or propagated signal.

Examples of each element of FIG. 8 are broadly described above with respect to FIGS. 1-6. In particular, client 802 typically has attributes comparable to those described with respect to client devices 120, 220, 320, 420, 520, and 620, and/or client controllers 125, 225, 325, 425, 525, and 625. The host 804 typically has attributes comparable to those described above with respect to host devices 135, 235, 335, 435, 535, and 635 and/or host controllers 140, 240, 340, 440, 540, and 640. The client 802 and the host 804 may be directly or indirectly interconnected through a known or described delivery network.

As shown in FIG. 8, the host 804 includes a targeting server 8042, an instant voting server 8044a, and a routing processor 8046. In one implementation, and with reference to FIG. 6, the targeting server 8042 is a non-podded server 6802, the instant voting server 8044a is a podded server, and the routing processor 8046 is a podded routing processor.

In this implementation, the targeting server 8042 designates polling rules (step 805). The targeting server 8042 may perform such designation in response to user input and/or commands from another server in the pod 6810 or the OSP host complex 680. The polling rules may include, but are not limited to, the polling issue or question, the target audience or group, and the time limit for answering.

The targeting server 8042 then sends one or more commands that reflect the designated polling rules to one or more instant voting servers 8044a (step 806). Each instant voting server may be a podded server associated with a pod. It is understood, however, that each instant voting server may represent a network of interconnected instant voting servers associated with a pod.

The instant voting server 8044a receives the commands reflecting the polling rules from the targeting server 8042 (step 807). The instant voting server 8044a then sends a query to a routing processor 8046 requesting user context information (step 808). In general, the instant voting server 8044a is concerned only with context information of users within the pod.

The routing processor 8046 receives the query requesting user context information from the instant voting server 8044a (step 810). In one implementation, the routing processor 8046 acquires user context information for all users on the pod in response to the query (step 812). Alternatively, the routing processor 8046 may continuously maintain context information for all users on the pod. As described above, user context information may include, but is not limited to, a user's name, screen name, geographic location, software version, billing information, network information, account number, access device, and/or a recent history of accessed online locations.

The routing processor 8046 sends the user context information to the instant voting server 8044a (step 814). The instant voting server 8044a receives the user context information from the routing processor 8046 (step 816). Then, the instant voting server 8044a applies the polling rules against the user context information to identify targeted online users (step 818). In one implementation, the online users are sorted and/or ranked based on parameters established by the polling rules. Such parameters may include, for example, geographic location and/or online location.

The instant voting server 8044a sends a polling request to the client of a targeted online user (step 820). In one implementation, the polling request includes an electronic ballot and an elapsing time limit for completing the electronic ballot. The elapsing time limit may be common to all targeted online users. The elapsing time limit may be a relatively short time interval, such as, for example, less than two minutes. The elapsing time limit may begin when the electronic ballot is initially displayed to the online users and may expire after a fixed time interval.

The client 802 of the targeted online user displays the polling request (step 822). The targeted online user completes the electronic ballot prior to the expiration of the time limit. The client 802 then transmits a response to the polling request to the instant voting server 8044a (step 824).

The instant voting server 8044a receives the response to the polling request from the client 802 (step 826). The instant voting server 8044a then aggregates all received responses to the polling requests (step 828). In general, the instant voting server 8044a aggregates responses from targeted online users of a particular pod.

The instant voting server 8044a then sends the aggregate value of the responses to the targeting server 8042 (step 830). The targeting server 8042 receives the aggregate value of responses from the instant voting server 8044a (step 832). In general, the targeting server 8042 will receive an aggregate value of responses from each instant voting server representing each pod in the OSP host complex 680. The targeting server 8042 then tallies the responses (step 834).

After a result of the polling has been reached, the targeting server 8042 may store the result, or may cause the result to be displayed on the client 802 of a targeted online user. In one implementation, the host 804 displays particular content to the online users based on result of the tallying. Particular content may include, but is not limited to, a graphical user interface and/or multimedia data.

Figure 9:
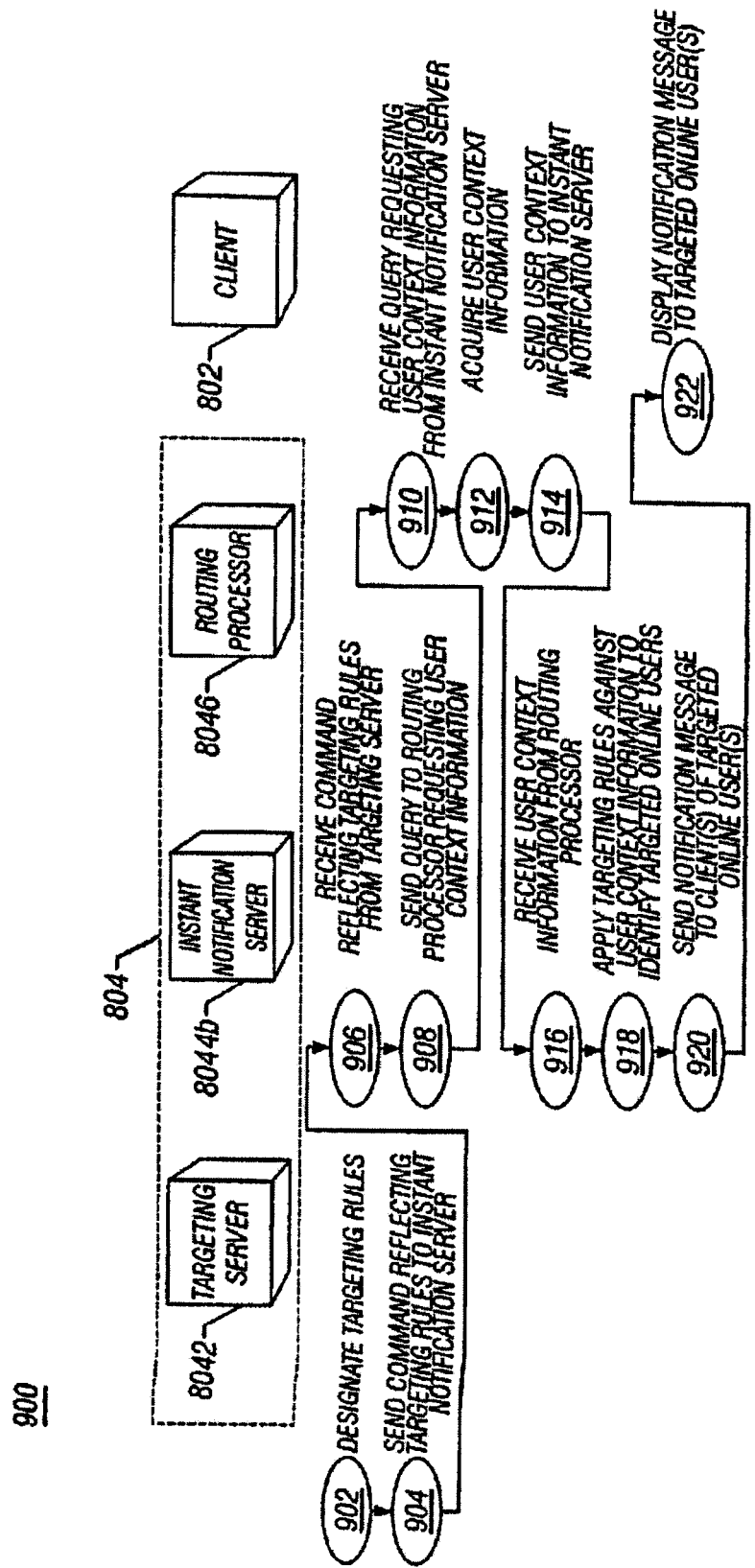
FIG. 9 illustrates a flow chart of a communications method that may be implemented by the communications system of FIG. 1 to display a notification message to a subset of online users.

Referring to FIG. 9, the client 802 and the host 804 also may interact according to a procedure 900 to transmit electronic data. The procedure 900 may be implemented by any type of hardware, software, device, computer, computer system, equipment, component, program, application, code, storage medium, or propagated signal.

The targeting server 8042 designates targeting rules (step 902). The targeting server 8042 then sends commands reflecting the targeting rules to the instant notification server 8044b (step 904).

The instant notification server 8044b receives the commands reflecting the targeting rules from the targeting server 8042 (step 906). The instant notification server 8044b then sends a query to the routing processor requesting user context information (step 908).

The routing processor 8046 receives the query requesting the user context information from the instant notification server 8044b (step 910). The routing processor 8046 then acquires the user context information (step 912). Alternatively, the routing processor 8046 continuously maintains user context information for all online users.

The routing processor 8046 sends the user context information to the instant notification server 8044b (step 914). The instant notification server 8044b receives the user context information from the routing processor 8046 (step 916). The instant notification server 8044b applies the targeting rules against the user context information to identify targeted online users (step 918).

The instant notification server 8044b then sends a notification message to a client 802 of a targeted online user (step 920). The client 802 then displays the notification message to the targeted user of (step 922).

Figure 10:
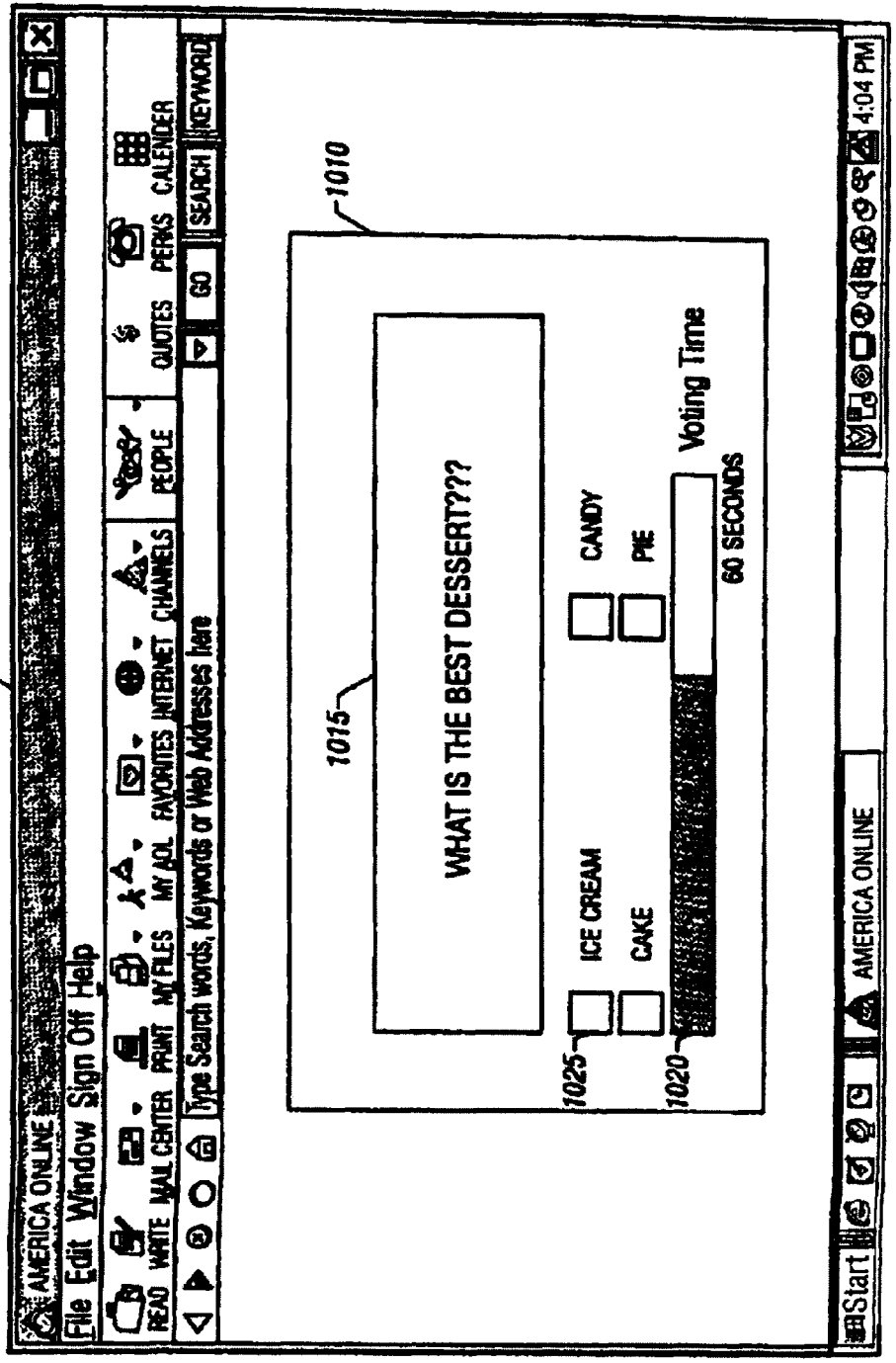
FIGS. 10 and 11 are illustrations of different graphical user interfaces.

Referring to FIG. 10, a user interface (UI) 1000 illustrates an example of how a polling request is displayed to a targeted online user. The UI 1000 includes a browser window 1005 rendering an electronic ballot 1010. The electronic ballot 1010 includes a polling issue or question 1015, an elapsing voting time limit box 1020, and selectable answers 1025 for voting the electronic ballot 1010.

Figure 11:
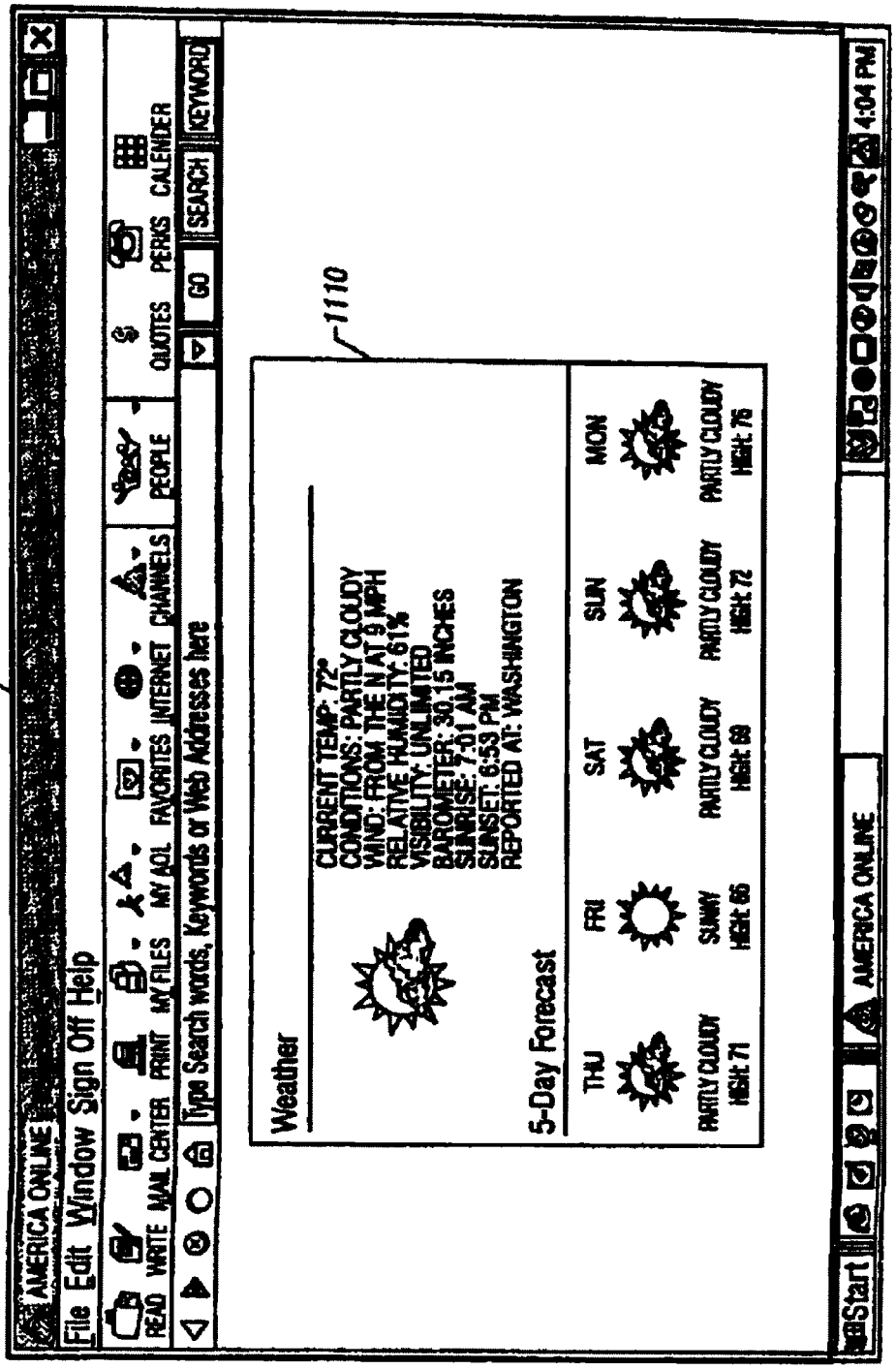

Referring to FIG. 11, a UI 1100 illustrates an example of how a notification message is displayed to a targeted online user. The UI 1100 includes a browser window 1105 rendering a notification message 1110. In this example, the notification message includes timely weather information. In general, the notification message 1110 is specific to a location of the targeted online users. As shown in FIG. 11, the location of the targeted online users is Washington, D.C.

Other implementations are within the scope of the following claims. For example, the general aspects described above relate to instant messaging and e-mail as well as other forms of communication such as, for example, telephonic communication.

What is claimed is:

1. A computer-implemented method for identifying and messaging multiple targeted users of a communications system, the method comprising:
   accessing targeting rules that define parameters to identify multiple users to which a message is to be sent;
   accessing context information for the multiple users;
   applying, with at least one processor, the accessed targeting rules to the accessed context information;
   identifying, with at least one processor, a subset of the multiple users based on the application of the accessed targeting rules to the accessed context information, wherein the identified subset of the multiple users includes more than one of the multiple users but less than all of the multiple users; and
   sending the message to client devices of the identified subset of the multiple users.

2. The method of claim 1, wherein the parameters specify an online location, and the targeting rules are applied to the context information to determine which ones of the multiple users are visiting the online location.

3. The method of claim 2, wherein the message is specific to the online location.

4. The method of claim 1, wherein the parameters specify a particular type of access device, and the targeting rules are applied to the context information to determine which ones of the multiple users employ the particular type of access device.

5. The method of claim 1, wherein the parameters specify a particular type of software, and the targeting rules are applied to the context information to determine which ones of the multiple users employ the particular type of software.

6. The method of claim 1, wherein the context information specifies a history of accessed online locations, and the targeting rules are applied to the context information to determine which ones of the multiple users have accessed the online locations.

7. The method of claim 1, wherein the context information specifies at least one of a user's name, screen name, software version, billing information, network information, account number, and access device.

8. A communications system, comprising:
   a storage device that stores a set of instructions; and
   at least one processor that executes the set of instructions to:
   access targeting rules that define parameters to identify multiple users to which a message is to be sent;
   access context information for the multiple users;
   apply the accessed targeting rules to the accessed context information;
   identify a subset of the multiple users based on the application of the accessed targeting rules to the accessed context information, wherein the identified subset of the multiple users includes more than one of the multiple users but less than all of the multiple users; and
   cause the message to be sent to client devices of the identified subset of the multiple users.

9. The communications system of claim 8, wherein the parameters specify an online location, and the targeting rules are applied to the context information to determine which ones of the multiple users are visiting the online location.

10. The communications system of claim 9, wherein the message is specific to the online location.

11. The communications system of claim 8, wherein the parameters specify a particular type of access device, and the targeting rules are applied to the context information to determine which ones of the multiple users employ the particular type of access device.

12. The communications system of claim 8, wherein the parameters specify a particular type of software, and the targeting rules are applied to the context information to determine which ones of the multiple users employ the particular type of software.

13. The communications system of claim 8, wherein the context information specifies a history of accessed online locations, and the targeting rules are applied to the context information to determine which ones of the multiple users have accessed the online locations.

14. The communications system of claim 8, wherein the context information specifies at least one of a user's name, screen name, software version, billing information, network information, account number, and access device.

15. A non-transitory computer-readable medium storing instructions that, when executed by at least one processor, cause the processor to perform a method comprising:
   accessing targeting rules that define parameters to identify multiple users to which a message is to be sent;
   accessing context information for the multiple users;

applying the accessed targeting rules to the accessed context information;

identifying a subset of the multiple users based on the application of the accessed targeting rules to the accessed context information, wherein the identified subset of the multiple users includes more than one of the multiple users but less than all of the multiple users; and sending the message to client devices of the identified subset of the multiple users.

16. The computer-readable medium of claim 15, wherein the parameters specify an online location, and the targeting rules are applied to the context information to determine which ones of the multiple users are visiting the online location.

17. The computer-readable medium of claim 15, wherein the parameters specify a particular type of access device, and the targeting rules are applied to the context information to determine which ones of the multiple users employ the particular type of access device.

18. The computer-readable medium of claim 15, wherein the parameters specify a particular type of software, and the targeting rules are applied to the context information to determine which ones of the multiple users employ the particular type of software.

19. The computer-readable medium of claim 15, wherein the context information specifies a history of accessed online locations, and the targeting rules are applied to the context information to determine which ones of the multiple users have accessed the online locations.

20. The computer-readable medium of claim 15, wherein the context information specifies at least one of a user's name, screen name, software version, billing information, network information, account number, and access device.

* * * * *

UNITED STATES PATENT AND TRADEMARK OFFICE
CERTIFICATE OF CORRECTION

| | | |
|---|---|---|
| PATENT NO. | : 9,342,819 B1 | |
| APPLICATION NO. | : 13/343635 | |
| DATED | : May 17, 2016 | |
| INVENTOR(S) | : Barry Appelman et al. | |

It is certified that error appears in the above-identified patent and that said Letters Patent is hereby corrected as shown below:

Title page, item (63), "Continuation of application No. 09/842,024, filed on Apr. 26, 2001." should read --Continuation of application No. 12/720,044, filed on Mar. 9, 2010, now Pat. No. 8,095,609, which is a continuation of application No. 09/842,024, now Pat. No. 7,703,611.--.

Signed and Sealed this
Second Day of August, 2016

Michelle K. Lee
*Director of the United States Patent and Trademark Office*